(12) United States Patent
Verdura Pares

(10) Patent No.: US 6,574,910 B1
(45) Date of Patent: Jun. 10, 2003

(54) DEVICE TO AUTOMATICALLY DEPLOY THE WEIGHT ON A FISHING LINE

(76) Inventor: Nuria Verdura Pares, La Cerca, 2, 15009 La Curuda (ES)

( * ) Notice: Subject to any disclaimer, the term of this patent is extended or adjusted under 35 U.S.C. 154(b) by 0 days.

(21) Appl. No.: 09/709,411
(22) Filed: Nov. 13, 2000
(65) Prior Publication Data
(65)
(30) Foreign Application Priority Data Nov. 10, 1999 (ES) .......................................... 9902835 U

(51) Int. Cl.[7] .............................................. A01K 95/00
(52) U.S. Cl. ...................................... 43/44.88; 43/44.9
(58) Field of Search ........................... 43/25, 27.2, 27.4, 43/43.14, 43.13, 43.12, 43.1, 17.2, 44.87, 44.92, 44.9, 44.91, 42.49

(56) References Cited

U.S. PATENT DOCUMENTS 2,888,771 A * 6/1959 Stephens ..................... 43/41.2
3,589,052 A * 6/1971 King .......................... 43/44.88
3,659,372 A * 5/1972 Cullen ....................... 43/44.88
3,672,087 A * 6/1972 Milburn, Jr. ................ 43/44.88
4,845,885 A * 7/1989 Rubbelke .................... 43/44.95
5,937,565 A * 8/1999 Maric et al. ................... 43/15

* cited by examiner

Primary Examiner—Peter M. Poon
Assistant Examiner—Susan Piascik
(74) Attorney, Agent, or Firm—Crowell & Moring LLP

(57) ABSTRACT

A device automatically deploys a weight on a fishing pole's fishing line and includes a tubular casing inside of which a weight with a height lower than the casing supported by an end cap closure is positioned. On the other end of the casing, a tubular piece, which emerges outside, is attached. This piece also has (attached inside it) a longer-length tubular piece which has a flared interior diameter. The free interior end sits on a spring mounted outside on a tubular piece which is deployed inside the last piece cited. The piece on which the spring is mounted has a support flaring for that spring and is attached at its free end in a central weight notch with an axial boring through which the line-which goes through all the aforementioned pieces-passes. The tubular piece on which the spring is mounted has faced lateral end borings on which several balls are positioned in the interior tubular piece with the balls remaining in the flaring area of this piece. The balls are caused to move laterally and to release the fishing line from the device that slides freely downward until it reaches the bait or the hook.

6 Claims, 2 Drawing Sheets

DEVICE TO AUTOMATICALLY DEPLOY THE WEIGHT ON A FISHING LINE

BACKGROUND OF THE INVENTION

This application claims priority of Spanish Application Ser. No. 9902835, filed on Nov. 10, 1999, the disclosure of which is expressly incorporated by reference herein.

The present invention is directed to a device to automatically deploy the weight on a fishing line for troll fishing and the like.

One of the main problems troll fishermen have is positioning the weight at the suitable distance with respect to the bait. There are several types of weights on the market, but all of them require manual action for release. This manual action interrupts the natural action of fishing and causes several inconveniences.

SUMMARY OF THE INVENTION

An object of the present invention is to overcome this problem by preventing any action that may prevent direct contact with the catch.

The present invention has achieved this object by providing a device which has several weights and passes over the line where a stop or tourniquet is placed that performs the function of preventing the line from slipping. The stop is placed at a distance chosen by the user.

While the fisherman draws in the line, the device reaches the end of the rod where pressure, sufficient to release the aforementioned stop, is applied. By its own weight, the device slides slowly over the line until it reaches the bait.

The device can be made of any suitable plastic or metallic material in different colors or sizes, thus satisfying the needs of the fisherman depending on the type of fishing being done.

BRIEF DESCRIPTION OF THE DRAWINGS

Other objects, advantages and novel features of the present invention will become readily apparent from the following detailed description of the invention when considered in conjunction with the accompanying drawings.

DETAILED DESCRIPTION OF THE DRAWINGS

Figure 1:
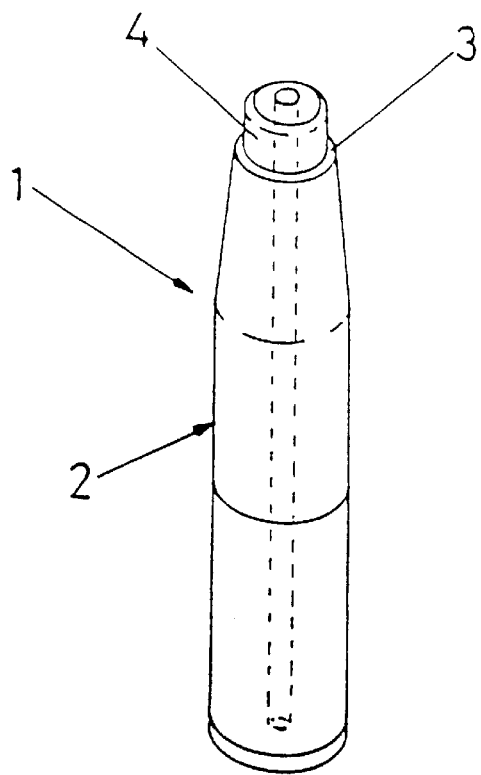
FIG. 1 is a perspective view of the device according to the present invention.
Figure 2:
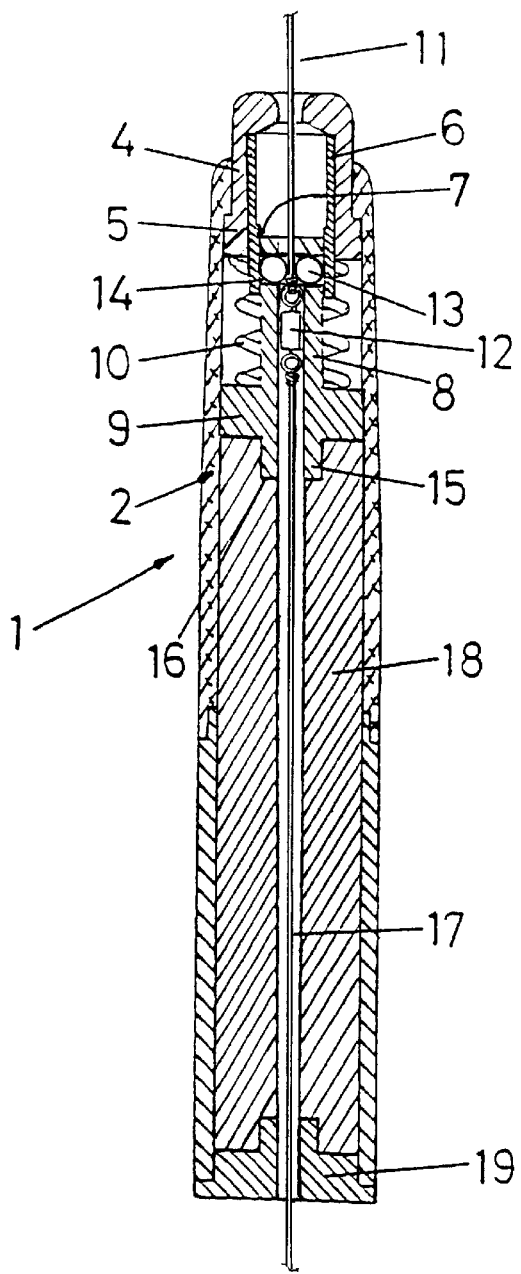
FIG. 2 is a cross-sectional view of the device of FIG. 1 shown mounted on the line of a fishing pole.

A device designated generally by numeral 1 according to the present invention includes an outer sleeve or casing 2 preferably made of tubular plastic and having a piece 4 attached to its smaller diameter end 3, which emerges outside and reaches an end 3 of the casing 2 by way of a flared portion 5.

Another tubular piece 6 of lesser length than the piece 4 and with a flared section of diameter 7 in the extreme upper part is attached inside the piece 4.

Another tubular piece 8 has an end attached inside the piece 6 and has an end flared member 9 that helps to support a spring 10 on the outside of the piece 8. The fishing line 11 passes through the tubular piece 8 in which is positioned a spinning tourniquet 12 which defines a limit device with two lateral faced balls 13 mounted on several borings 14 of the piece 6.

Figure 3A:
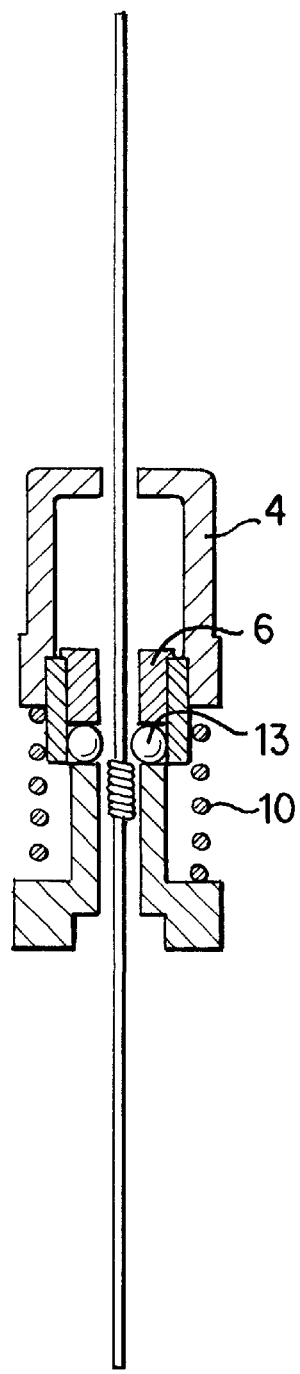
FIGS. 3a and 3b are isolated views of the device in the area of the dotted circle in FIG. 2 in which the device has reached the end of the line in the former figure and in which the device is lowered in the latter figure.

When the device 1 reaches the end of the fishing rod, as shown in FIG. 3a, the piece 4 is moved axially or deploys and, with it, also the piece 6 which, at its end, pressures or biases spring 10. The pressure of the spring 10 is supported by the flared member of the piece 8, given that this piece 8 at its other or lower end 15 is attached at flared surface 16, which has an axial borehole 17 in a weight portion 18 which is supported by end cap 19 having a central bore hole through which the line 11 passes.

Figure 3B:
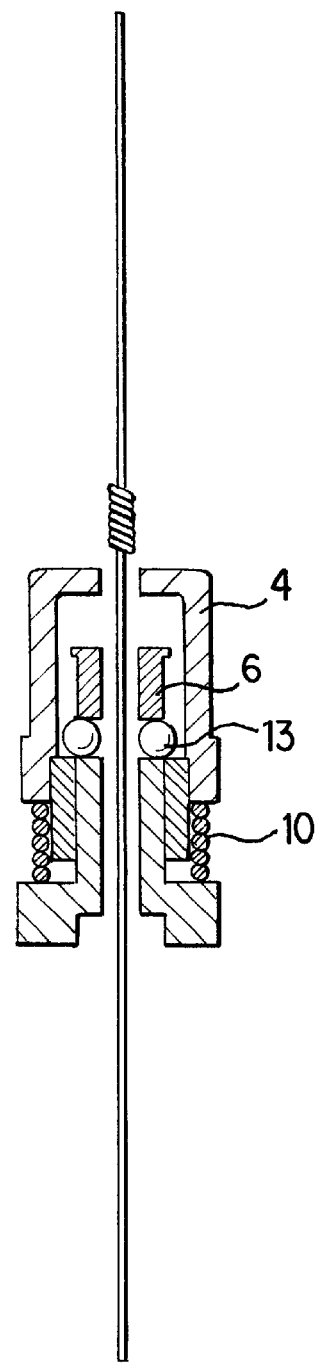

When the pieces 4, 6 are deployed or moved axially inwardly, as shown in FIG. 3b, the boreholes 14 facing the piece 8 reach the interior flared section 7, of the piece 6. This causes the balls to deploy radially outwardly due to the pressure exerted by spinning tourniquet 12 allowing it to pass through. The device 1 is, then, deployed or lowered slowly toward the bait. The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for deploying a weight along a fishing rod line, comprising:

a tubular casing;

a weight arranged within the tubular casing and supported at one end thereof, the weight being sized to have a height which is less than a height of the tubular casing;

a first tubular piece operatively arranged within and at another end of the tubular casing, the first tubular piece being sized to project outside the tubular casing;

a second tubular piece arranged within the first tubular piece and having an inwardly-directed flared portion;

a third tubular piece operatively arranged between the weight and the first tubular piece;

a spring operatively arranged between the first and third tubular pieces so as to support a free end of the second tubular piece thereon; and means operatively associated with the second and third tubular pieces to release the device so as to be slidable downwardly along the line until said means engages a hook or bait on the line.

2. The device according to claim 1, wherein the third tubular piece has a flared portion for supporting the spring and a free end portion having an axial bore through which, together with passages in the weight, the tubular casing and the first tubular piece, the line passes.

3. The device according to claim 1, wherein the third tubular piece has an end bore face at the free end thereof, and the releasing means includes a plurality of balls operatively arranged at the free end of the end bore face such that, where the device reaches a fishing rod end the first tubular piece, together with the second tubular piece, is moved relative to the tubular casing to compress the spring and allow the balls to move radically outwardly into a portion of the second tubular piece having a thinner wall thickness than the inwardly-directed flared portion thereof.

4. A device for deploying a weight along a fishing rod line, comprising a plurality of spring-biased relatively movable parts, and a line engaging mechanism configured to disengage from the line when the device reaches a fishing rod end so as to allow the device to travel along the line to a desired location on the line, wherein the relatively movable parts comprise:

a tubular casing;

a weight arranged within the tubular casing and supported at one end of the latter, the weight being sized to have a height which is less than a height of the tubular casing;

a first tubular piece operatively arranged within and at another end of the tubular casing, the first tubular piece being sized to project outside the tubular casing;

a second tubular piece arranged within the first tubular piece and having an inwardly-directed flared portion; and a third tubular piece operatively arranged between the weight and the first tubular piece.

5. A device for deploying a weight along a fishing line, comprising a plurality of spring-biased relatively movable parts, and a line engaging mechanism configured to disengage from the line when the device reaches a fishing rod end so as to allow the device to travel along the line to a desired location on the line, wherein the mechanism includes a plurality of balls operatively arranged to move away from the line when one of the moving parts is moved relative to another of the moving parts against a spring bias.

6. The device according to claim 4, wherein a spring is operatively arranged between the first and third tubular pieces so as to support a free end of the second tubular piece and to provide the spring bias for the relatively movable parts.

* * * * *